US006679523B2

(12) United States Patent
Yamamoto et al.

(10) Patent No.: US 6,679,523 B2

(45) Date of Patent: Jan. 20, 2004

(54) SUB-FRAME STRUCTURE OF MOTOR-VEHICLE

(75) Inventors: Tadanobu Yamamoto, Hiroshima-Ken (JP); Susumu Sano, Hiroshima-Ken (JP); Tadashi Yoshimura, Hiroshima-Ken (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 09/951,229

(22) Filed: Sep. 12, 2001

(65) Prior Publication Data

US 2002/0033594 A1 Mar. 21, 2002

(30) Foreign Application Priority Data

Sep. 19, 2000 (JP) ....................................... 2000-283265
Dec. 28, 2000 (JP) ....................................... 2000-402585

(51) Int. Cl.[7] ................................................ B62D 21/12

(52) U.S. Cl. ....................... 280/785; 280/796; 280/781; 180/311; 296/204

(58) Field of Search ................................ 280/781, 785, 280/791, 795, 796, 797, 798, 124.109; 180/311, 312; 296/204, 205; 29/897.2, 897.312, 897.35

(56) References Cited

U.S. PATENT DOCUMENTS

| | | | | |
|---|---|---|---|---|
| 2,809,050 A | * | 10/1957 | Bauer | 280/795 |
| 2,880,013 A | * | 3/1959 | Dean | 280/798 |
| 5,096,010 A | | 3/1992 | Ojala et al. | |
| 5,338,080 A | * | 8/1994 | Janotik et al. | 296/29 |
| 5,557,961 A | | 9/1996 | Ni et al. | |
| 5,573,274 A | | 11/1996 | Koketsu | |
| 5,641,180 A | * | 6/1997 | Kamei et al. | 280/781 |
| 5,884,722 A | * | 3/1999 | Durand et al. | 180/312 |
| 6,010,155 A | * | 1/2000 | Rinehart | 280/781 |
| 6,120,059 A | * | 9/2000 | Beckman | 280/785 |
| 6,193,274 B1 | * | 2/2001 | Brown et al. | 280/784 |
| 6,378,645 B1 | * | 4/2002 | Uegane et al. | 180/309 |
| 6,511,096 B1 | * | 1/2003 | Kunert et al. | 280/785 |

FOREIGN PATENT DOCUMENTS

| | | |
|---|---|---|
| EP | 0 760 265 | 3/1997 |
| EP | 0 926 048 | 6/1999 |
| JP | 7-81611 | 3/1995 |
| JP | 9-86435 | 3/1997 |

* cited by examiner

*Primary Examiner*—David R. Dunn
(74) *Attorney, Agent, or Firm*—Brooks Kushman P.C.

(57) ABSTRACT

A sub-frame structure of a motor vehicle includes a pair of side frame sections and a cross member section. The pair of side frame sections extend in the longitudinal direction of the vehicle at prescribed lateral spacing and include laterally inward bends in each section. The cross member section connects front ends of the side frame sections. The cross member section and end portions of the side frame sections connected to the cross member section are integrally formed of a deformed tube member. The remaining portions of the frame member sections including said bends are formed of a closed section member fabricated by joining a plurality of members at flanges.

7 Claims, 11 Drawing Sheets

150
13
14
17
11
1
100
3

5
B
26
150
21
17
1
100
IX
IX
22
23
22
23
3
13
21

201
202
203
204
205
206
207
208
209
210
211
212
213
215
216
217

218
220
221
219
213
224
222
223
209
208

SUB-FRAME STRUCTURE OF MOTOR-VEHICLE

BACKGROUND OF THE INVENTION

1. Field of the Invention

The present invention relates to a sub-frame structure of a motor vehicle, and in particular to a sub-frame structure of a motor vehicle for use in connecting parts to a vehicle body.

2. Background Art

Side frames and other motor vehicle sub-frame structures for connecting parts, such as a suspension system, engine or the like, to the vehicle body are known.

A sub-frame structure using upper and lower members joined together to form a closed section has been proposed. However, it is difficult for this type of sub-frame structure to establish great strength with a small cross sectional area. In addition, since flange portions necessary for joining the upper and lower members extend outward from the sub-frame, it is difficult to efficiently utilize the space around the sub-frame.

Japanese Patent Unexamined Publication No. 9-86435 discloses a sub-frame structure made of tube members as a whole. Although this sub-frame does not encounter the above problem, the tube members are difficult to deform, especially into a complex configuration including consecutive small bends or curves with small radii of curvature and small corners. This is a serious problem for a sub-frame whose structure should be adjustable over a wide range depending on the positional relationship with the parts around it.

More specifically, in the case of a front sub-frame for a front engine front wheel drive (FF) type motor vehicle for example, a pair of longitudinally extending frame members are required to be widely spaced apart on the front side so as to provide a space for an engine and a transmission therebetween, and to be closely spaced on the rear side so as to improve the characteristics of a suspension system to be mounted on the rear side. Making this type of sub-frame structure entirely of tube members is difficult because it is hard to deform the tube blanks so as to have bends for making the transition from the widely spaced portion to the closely spaced portion.

Further it is difficult to directly mount parts on a sub-frame structure made of tube members. Therefore, the parts must be mounted by the brackets and this increases the number of parts required.

SUMMARY OF THE INVENTION

It is therefore an object of the present invention to provide a sub-frame structure of a motor vehicle that is easily adjustable into a desired configuration and that facilitates the mounting of parts.

The present invention achieves this object by providing a sub-frame structure of a motor vehicle comprising: a pair of side frame sections extending in a longitudinal direction of the vehicle at predetermined lateral spacing and each side frame section including a laterally inward bend; and a cross member section connecting front ends of the side frame sections; wherein the cross member section and end portions of the side frame sections including the front ends of the side frame sections connected to the cross member section are integrally formed of a deformed tube member and remaining portions of the side frame sections including the bends are formed of a closed section member fabricated by joining a plurality of members at flanges.

In a preferred embodiment of the present invention, the sub-frame structure further includes mounts for suspension arms provided in the closed section member.

In another preferred embodiment of the present invention, the mounts are provided in the bends.

In another preferred embodiment of the present invention, each mount comprises a mounting member having an inverted U-shaped member oriented to open laterally.

In another preferred embodiment of the present invention, the sub-frame structure comprises reinforcing members provided forwardly of the mounting members.

In another preferred embodiment of the present invention, the sub-frame structure comprises reinforcing members extending from the mounting members into the side frame sections.

In another preferred embodiment of the present invention, the reinforcing members are positioned at upper regions of the side frame sections.

In another preferred embodiment of the present invention, the sub-frame is a front sub-frame installed on a front side of the vehicle, an engine and a transmission being placed between a part of the side frame sections made of the deformed tube member.

In another preferred embodiment of the present invention, the sub-frame is a front sub-frame installed on a front side of the vehicle, an engine and a transmission being placed side-by-side between a part of the side frame sections made of the deformed tube member.

In another preferred embodiment of the present invention, the sub-frame structure comprises reinforcing brackets that join the end portions of the side frame sections to end portions of the cross member section.

In another preferred embodiment of the present invention, the sub-frame structure further comprises a pair of connecting brackets for connecting ends of the side frame sections to a dash lower panel and a side sill of the vehicle body provided at ends of the side frame sections.

The above and other objects and features of the present invention will be apparent from the following description of preferred embodiments of made with reference to the accompanying drawings.

DETAILED DESCRIPTION OF THE PREFERRED EMBODIMENT(S)

Hereinafter, preferred embodiments of the present invention will be explained with reference to the drawings.

Figure 1:
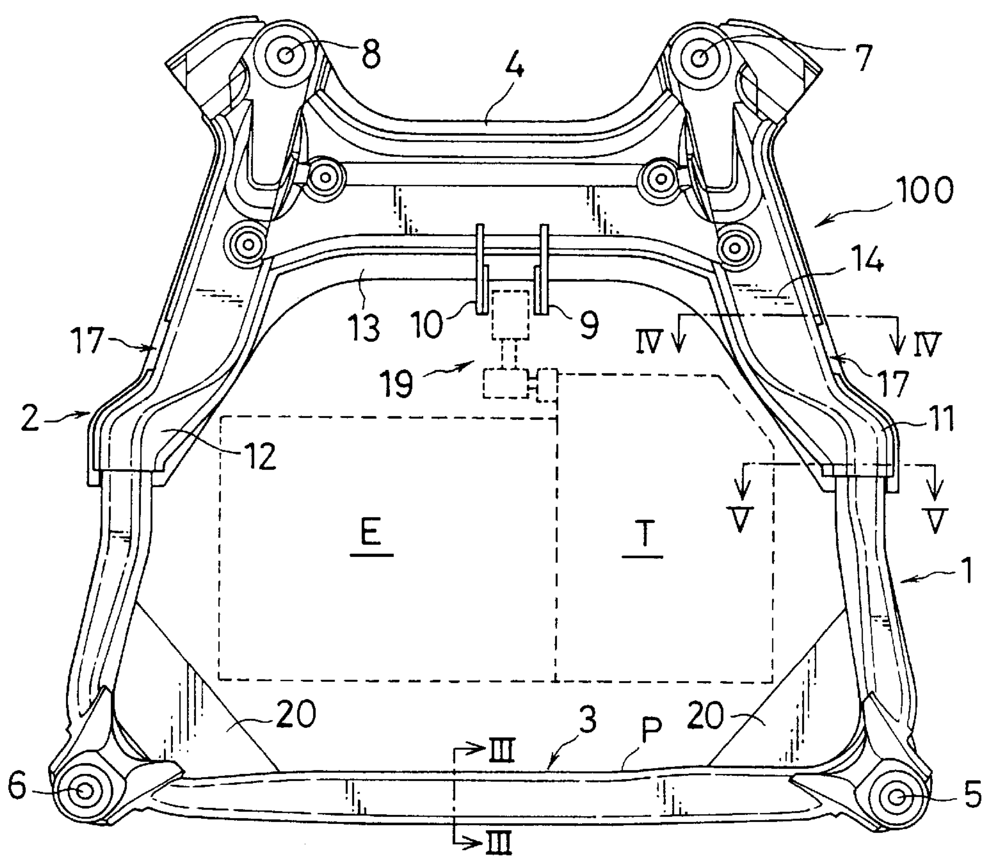
FIG. 1 is a plan view of a sub-frame structure of a motor vehicle according to a first embodiment of the present invention.
Figure 2:
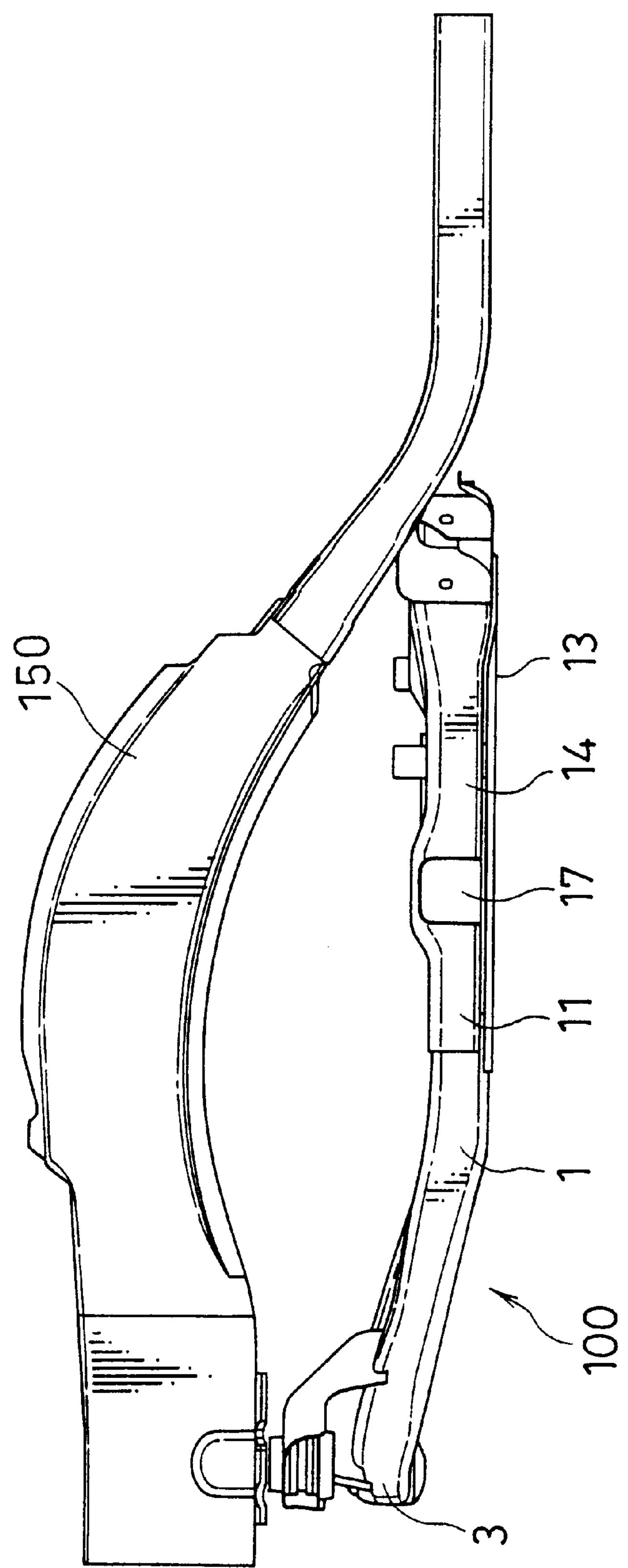
FIG. 2 is a side view showing the positional relationship between the sub-frame structure and a side frame.
Figure 3:
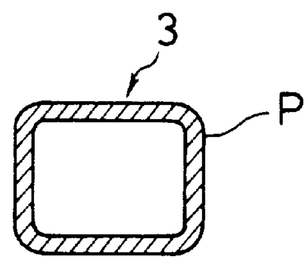
FIG. 3 is a cross sectional view taken along line III—III in FIG. 1.
Figure 4:
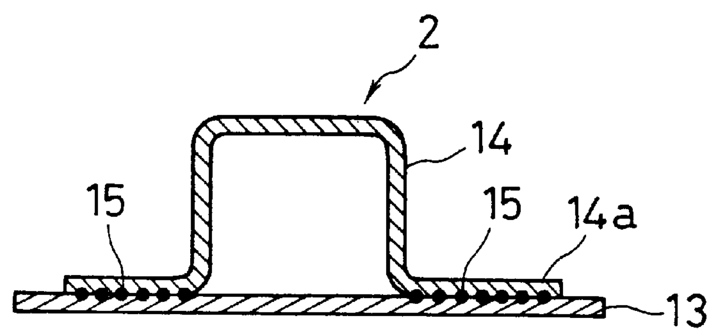
FIG. 4 is a cross sectional view taken along line IV—IV in FIG. 1.
Figure 5:
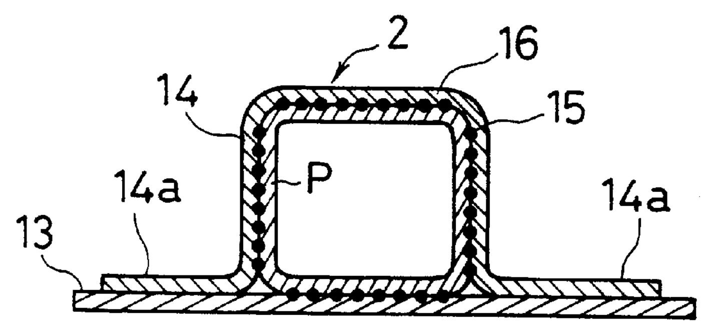
FIG. 5 is a cross sectional view taken along line V—V in FIG. 1.
Figure 6:
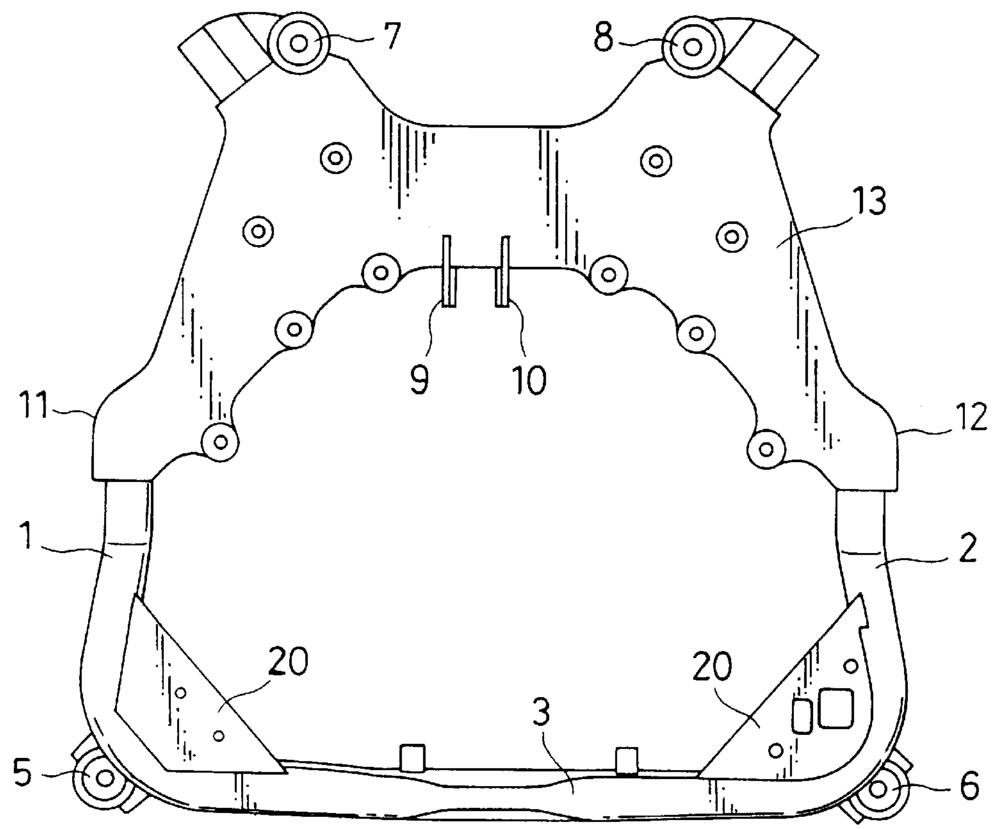
FIG. 6 is a bottom view of the sub-frame structure shown in FIG. 1.

A sub-frame 100 that is a first embodiment of the present invention will be explained with reference to FIGS. 1 through 9. FIG. 1 is a plan view of the sub-frame 100. FIG. 2 is a side view showing the positional relationship between the sub-frame 100 and a side frame 150. FIG. 3 is a cross sectional view taken along line III—III in FIG. 1. FIG. 4 is a cross sectional view taken along line IV—IV in FIG. 1. FIG. 5 is a cross sectional view taken along line V—V in FIG. 1. FIG. 6 is a bottom view of the sub-frame 100.

The sub-frame 100 is a front sub-frame situated in front of the cabin of a Front-engine Front-wheel-drive (FF) type motor vehicle. The sub-frame 100 includes a pair of side frame sections 1, 2 extending in the longitudinal direction of the vehicle, and a cross member section 3 connecting ends (the front ends) of the side frame member portions 1, 2. The other ends (the rear ends) of the side frame sections 1, 2 are connected to each other by a connecting portion 4 extending in the lateral direction of the vehicle. The sub-frame 100 has a generally rectangular configuration as a whole. As shown in FIG. 1, the sub-frame 100 is provided with front bolt holes 5, 6 and rear bolt holes 7, 8 for mounting the sub-frame 100 to a side frame 150 at each corner thereof. The center of the connecting member 4 is provided with a pair of engine mounting brackets 9, 10 connected to an engine E and a transmission T. The side frame sections 1, 2 include bends 11, 12 bending inward in the lateral direction. The bends 11. 12 comprise consecutive curves with small radii of curvature.

A front U-shaped part of the sub-frame 100 consisting of the front parts of the side frame sections 1, 2 and the cross member section 3 is integrally formed of a single deformed tube P. Thus, the sub-frame 100 has a tubular cross section in the front U-shaped part, as shown in FIG. 3.

In the first embodiment, the tube P is deformed into U-shaped configuration by a tube hydraulic forming process. The tube hydraulic forming process is described in Japanese Patent Unexamined Publication Nos. 8-337182 and 9-150752, for example. In the first embodiment, a steel tube blank is pre-formed into a configuration similar to the final configuration by a bender. Then, the pre-formed tube is pressed so as to be received in a mold for the tube hydraulic forming process. The pressed tube is placed in the mold for the tube hydraulic forming process and the mold is closed. Finally, the tube is deformed into the desired final configuration by supplying high-pressure fluid such as oil into the tube. The present invention is not limited to a tube deformed by the tube hydraulic forming process, however, and a tube deformed by another process may be used in the present invention.

The remaining rear parts of the side frame portions 1, 2 including the bends 11, 12 and the connecting portion 4 are formed of closed section members fabricated by joining a plurality of flanged members at their flanges. As shown in FIG. 4, each closed section member is fabricated by placing an upper member 14 having outwardly extending flange portions 14 a and an "inverted U" or "hat" shaped cross section onto a plate like lower member 13 and welding the upper member 14 to the lower member 13 at weld points 15 between the flanges **14*a* and the lower member 13. Although the weld points 15 are indicated as discrete points in FIG. 4, the upper member 14 and the lower member 13** are actually continuously welded by arc welding.

The rear parts of the side frame sections 1, 2 formed by the closed section members are connected to the front parts of the side frame sections 1, 2 formed by the tube P at the forward ends of the bends 11, 12. At the joint between the tube P and each closed section member, the tube P has an outer shape conforming to the inner shape of closed section member. The tube P is fixedly connected to the closed section member by inserting the rear end portion of the tube P into an area of the closed section formed by the lower member 13 and the upper member 14 and by welding the tube P, the lower member 13 and the upper member 14 at weld points 16 around the tube P, as shown in FIG. 5.

Figure 7:
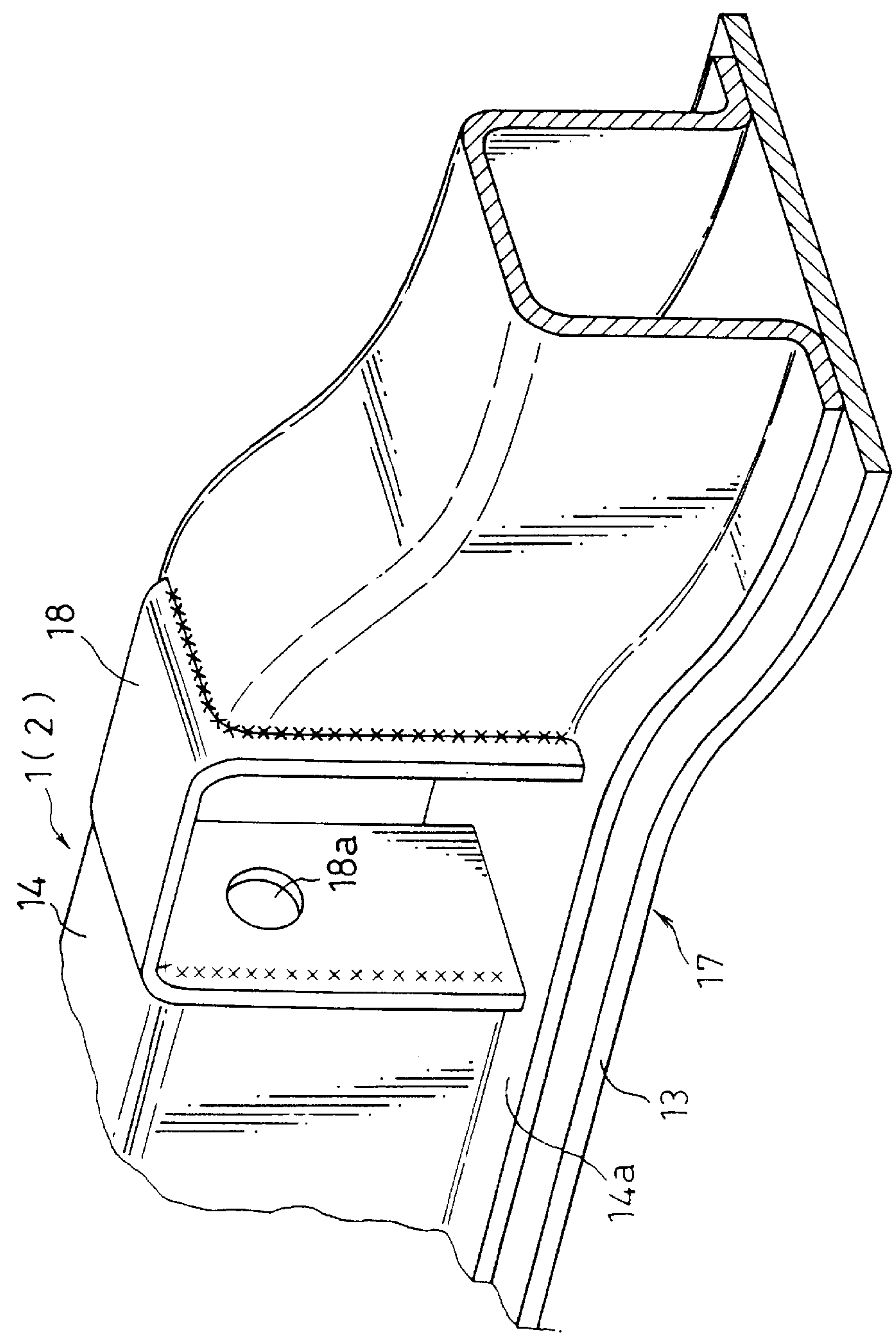
FIG. 7 is a perspective view of a mount for a suspension arm.

Each of the side frame sections 1, 2 is provided at a position rearward of the bend 11, 12 with a mount 17 to which one end of a suspension arm is connected. The mounts 17 each includes an inverted U-shaped mounting member 18, as shown in FIG. 7. The mounting member 18 is fixed in an opening in the side frame section 1, 2 formed by cutting away a part of the top and side walls of the upper member 14. The mounting members 18 are oriented so as to open in the lateral direction.

Bolt holes **18*a* are formed in the side walls of the mounting member 18. A bolt provided on one end of the suspension arm is inserted into the bolt holes 18*a* to connect the suspension arm to the mount 17. In the first embodiment, the suspension is of multi-link type and the end of the front arm of the suspension is connected to the mount 17**.

As shown in FIG. 1, the engine E and the transmission T are placed side by side in the lateral direction between the side frame sections 1, 2 formed by the tube P. The engine E and the transmission E are connected to each other and mounted on the pair of engine mounting brackets 9, 10 at the center of the connecting member 4 by means of a connecting mechanism 19. The engine E and the transmission T are additionally connected to the side frame 150 of the vehicle body at their right and left ends to be supported by the body at three points.

As shown in FIGS. 1 and 6, the sub-frame 100 includes reinforcing brackets 20, 20 connecting front portions of the side frame sections 1, 2 and the opposite ends of the cross member section 3. The reinforcing brackets 20 are steel plates of triangular shape. Each reinforcing bracket 20 is welded to the sub-frame 100 from the bottom side thereof so that one side is aligned with the front portion of the side frame sections 1, 2 and another side is aligned with the corresponding end portion of the cross member section 3.

In the first embodiment, the side frame sections 1, 2 bend laterally outward forward of the mount 17. In the front part, the side frame sections 1, 2 are arranged to provide enough clearance therebetween for placing the engine E and the transmission T side by side, and in the rear part, are arranged to situate the mounts 17 inward enough to enable the suspension arm to have adequate length.

Since the bends 11, 12 are formed by the closed section members each fabricated by joining the upper member 14 and the lower member 13, it is easy to form the bends including the consecutive sharp bends in the rear part of the side frame sections 1, 2 for arranging them with relatively narrow clearance. On the other hand, since the front part of the side frame sections 1, 2 and the cross member section 3, are formed by the tube member P, there is no flange in the front part. Therefore, the space surrounded by the front part of the side frame sections 1, 2 and the cross member section 3 can be efficiently utilized.

Figure 8:
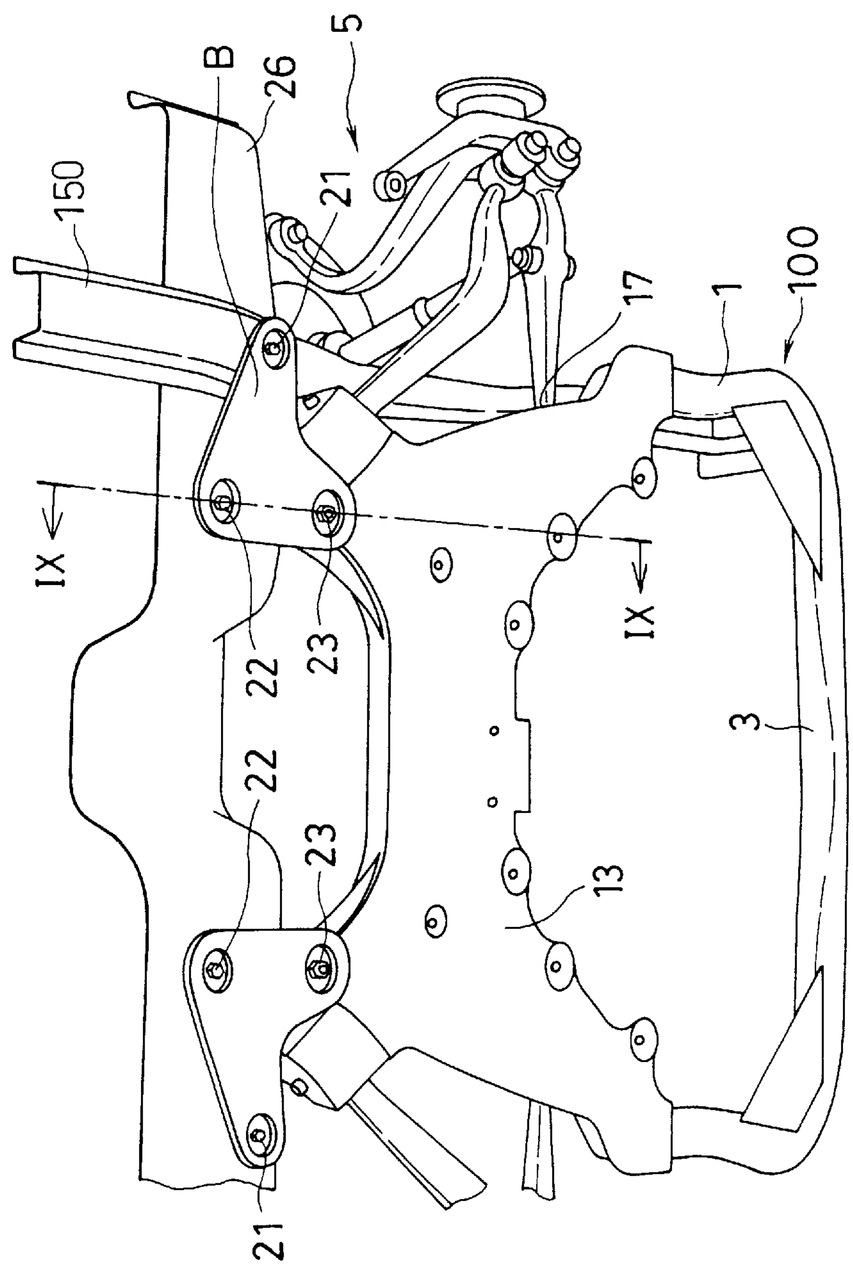
FIG. 8 is a perspective showing brackets used for mounting the sub-frame structure shown in FIG. 1 shown from the bottom side.
Figure 9:
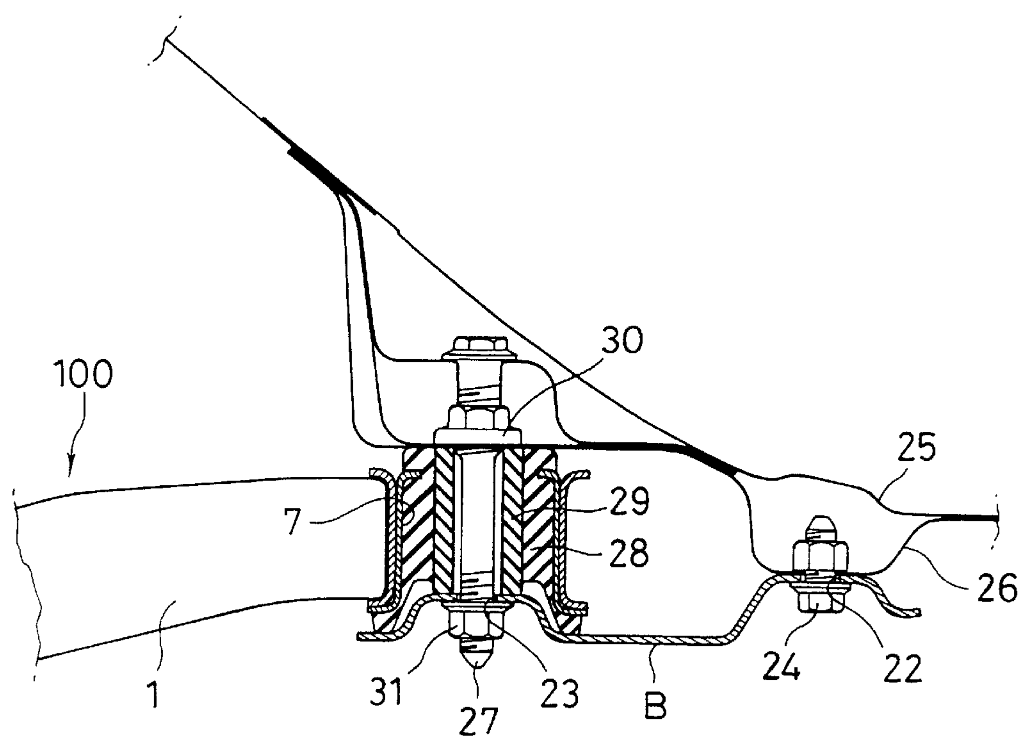
FIG. 9 is a cross sectional view taken along line IX—IX in FIG. 8.

FIG. 8 is a perspective view showing triangular brackets B for mounting the sub-frame 100 on the vehicle body. FIG. 9 is a cross-sectional view along line IX—IX in FIG. 8.

As shown in FIGS. 8, 9, the rear part of the sub-frame 100 is attached to the vehicle body via the triangular mounting brackets B. The vertices of the triangular mounting brackets B are formed with bolt holes 21, 22, 23 for passing bolts. In each bracket B, a bolt 24 passing through the laterally outward bolt hole 21 is fastened to the side frame 150. A bolt 24 passing through the rearward bolt hole 22 is fastened to a dash lower reinforcement member 26 mounted below a dash lower panel 25. A bolt or stud 27 passing through the forward bolt hole 23 passes through a rear bolt hole 7 in the sub-frame 100 and is fastened to the dash lower reinforcement member 26. As shown in FIG. 9, a rubber bush 29 surrounded by a cylindrical rubber member 28 is provided around the body stud 27 in the rear bolt hole 7. By tightening nuts 30, 31 threaded onto the body stud 27, the rubber bush 29 is tightened by the bracket B from underneath. Since the rubber bush 29 is supported at opposite ends of the body stud 27 in this arrangement, the rigidity of the body in this part is improved and tilting of the stud under force received from the suspension is prevented.

A second embodiment of the present invention will be explained with reference to FIGS. 10 through 14.

Figure 10:
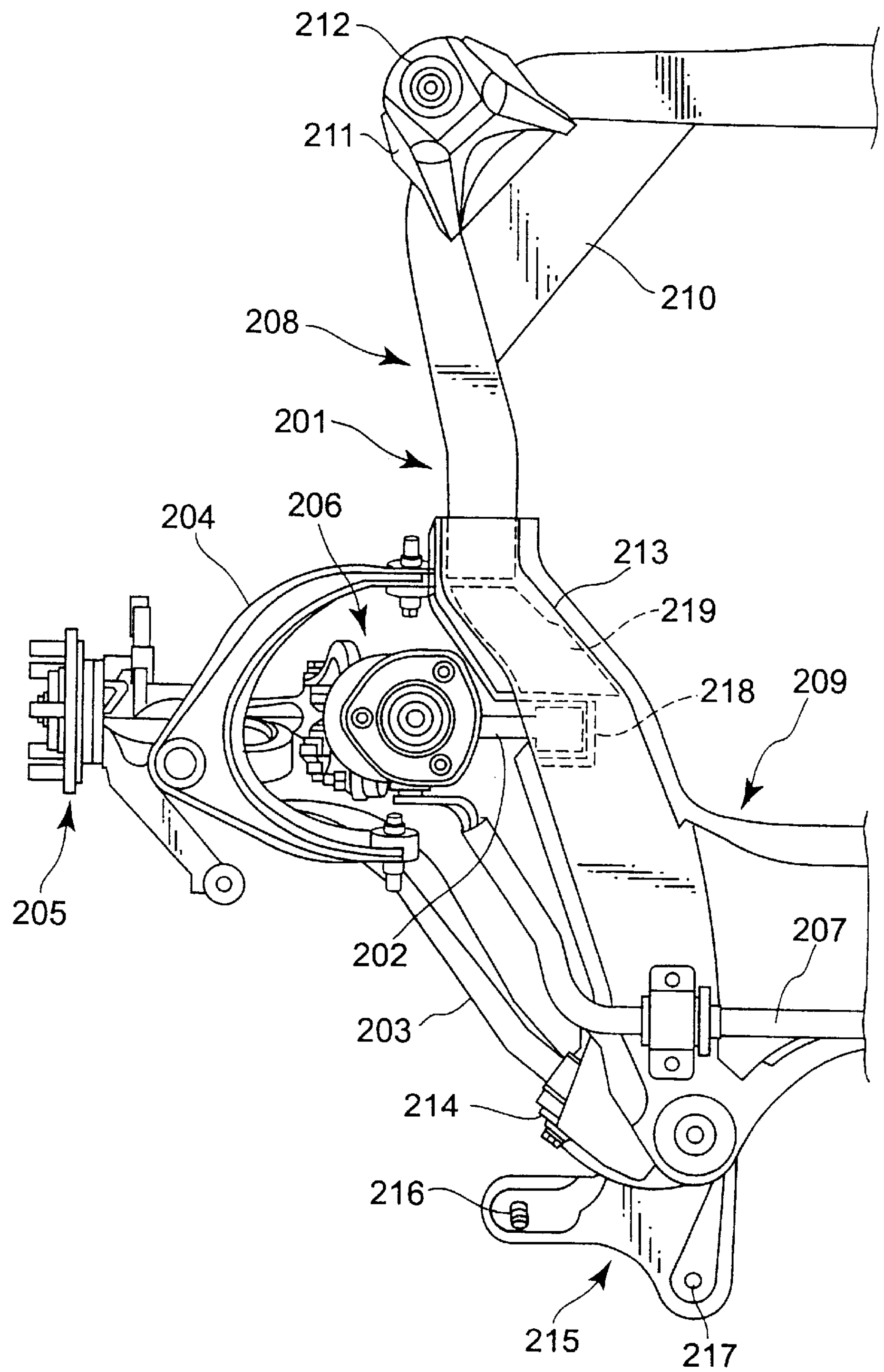
FIG. 10 is a plan view of a suspension structure of a motor vehicle according to a second embodiment of the present invention.
Figure 11:
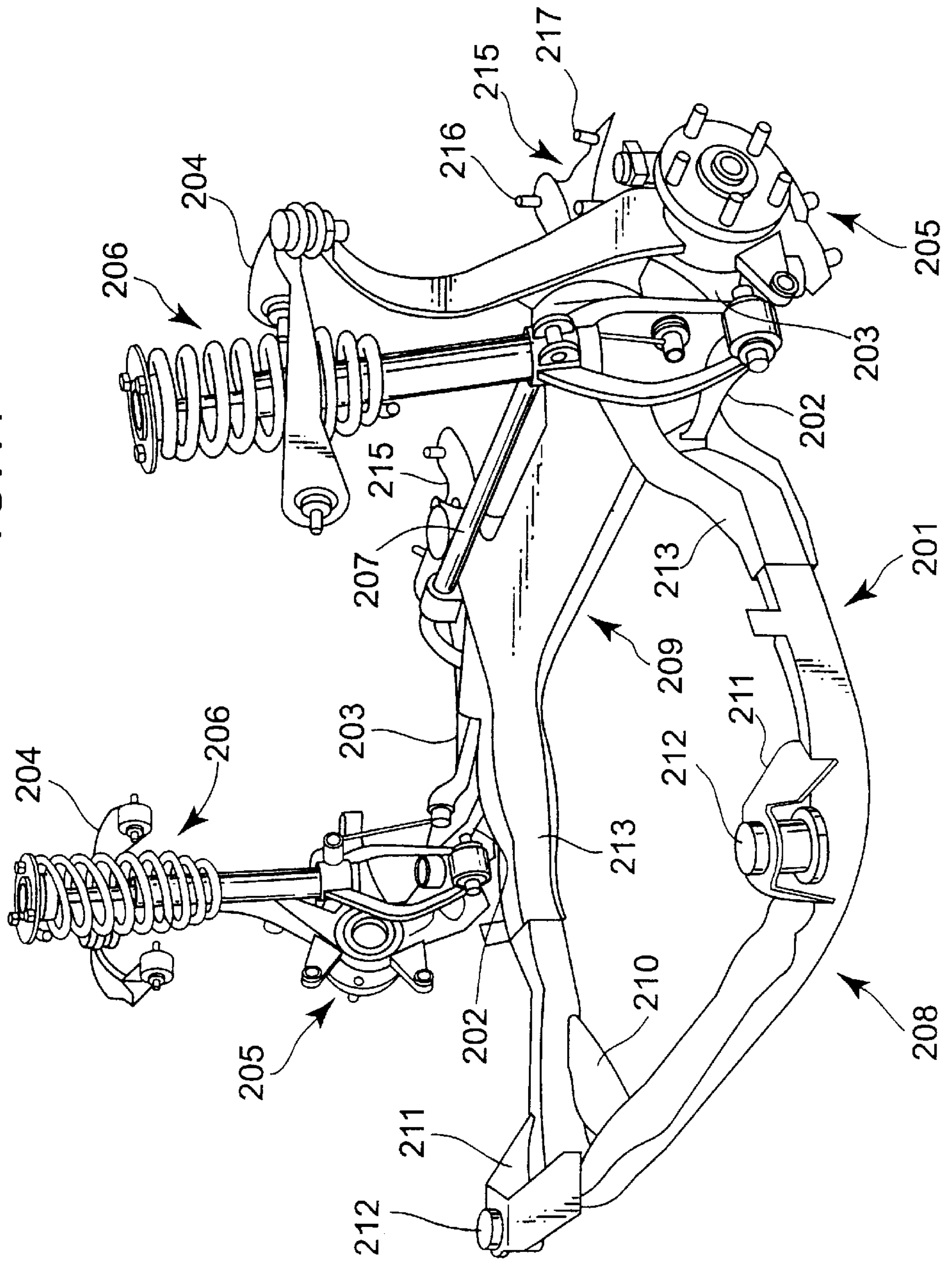
FIG. 11 is a perspective view of the suspension structure shown in FIG. 10.

FIGS. 10 and 11 show a vehicle suspension structure according to the second embodiment of the present invention. The suspension comprises a suspension frame 201 constituted as a perimeter frame; a pair of left and right front wheel supporting members 205 connected to the rear part of the suspension frame 201 by means of suspension arms including a pair of lower arms 202, 203 and an upper arm 204; a pair of suspension dampers 206 whose bottom ends are supported by the front lower arm 202; and a stabilizer 207 connecting the left and right suspension dampers 6 to each other.

The suspension frame 201 comprises a front-side first frame 208 that is substantially U-shaped in plan view and a rear-side second frame 209 that is substantially U-shaped in plan view. The rear ends of the first frame 208 are inserted into and joined to front ends of the second frame 209, for example by welding, to form a rectangular configuration.

The first frame 208 is fabricated from a tube such a hollow tube member deformed for example by a tube hydraulic forming process. The left and right front-ends of the first frame 208 are provided with reinforcing brackets 210, connecting brackets 211 for connecting the left and right front-ends of the suspension frame 201 to a front-side frame of the vehicle (not shown), and insulators 212.

Figure 14:
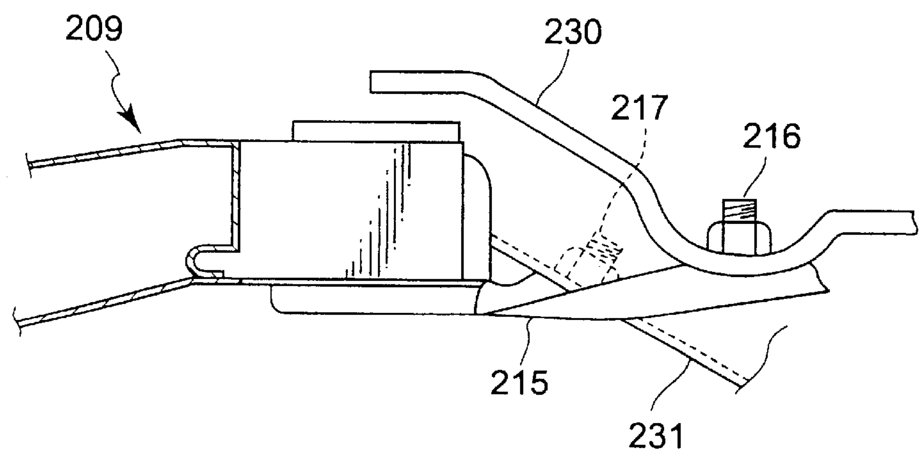
FIG. 14 is a partial cross sectional view showing the structure of a rear part of the second frame.

The second frame 209 comprises a pair of upper and lower press-formed steel members welded to each other. The front part of the second frame 209 includes bends 213 for defining a mounting space for parts such as the lower arms 202, 203. The right and left rear ends of the second frame 208 are provided with supporting brackets 214 for supporting the rear lower arms 203, which are arranged so that their distal ends extend in an obliquely forward direction of the vehicle, and connecting brackets 215 for connecting the right and left rear ends of the suspension frame 201 to the vehicle body. As shown in FIG. 14, a first bolt 216 passes through a rear end portion of each connecting bracket 215. As described hereinafter, the first bolt 216 is fixed to the dash panel of the vehicle body via a mounting bracket 230. A second bolt 217 fixed to a side sill passes through an outer portion of the connecting bracket 215.

Figure 12:
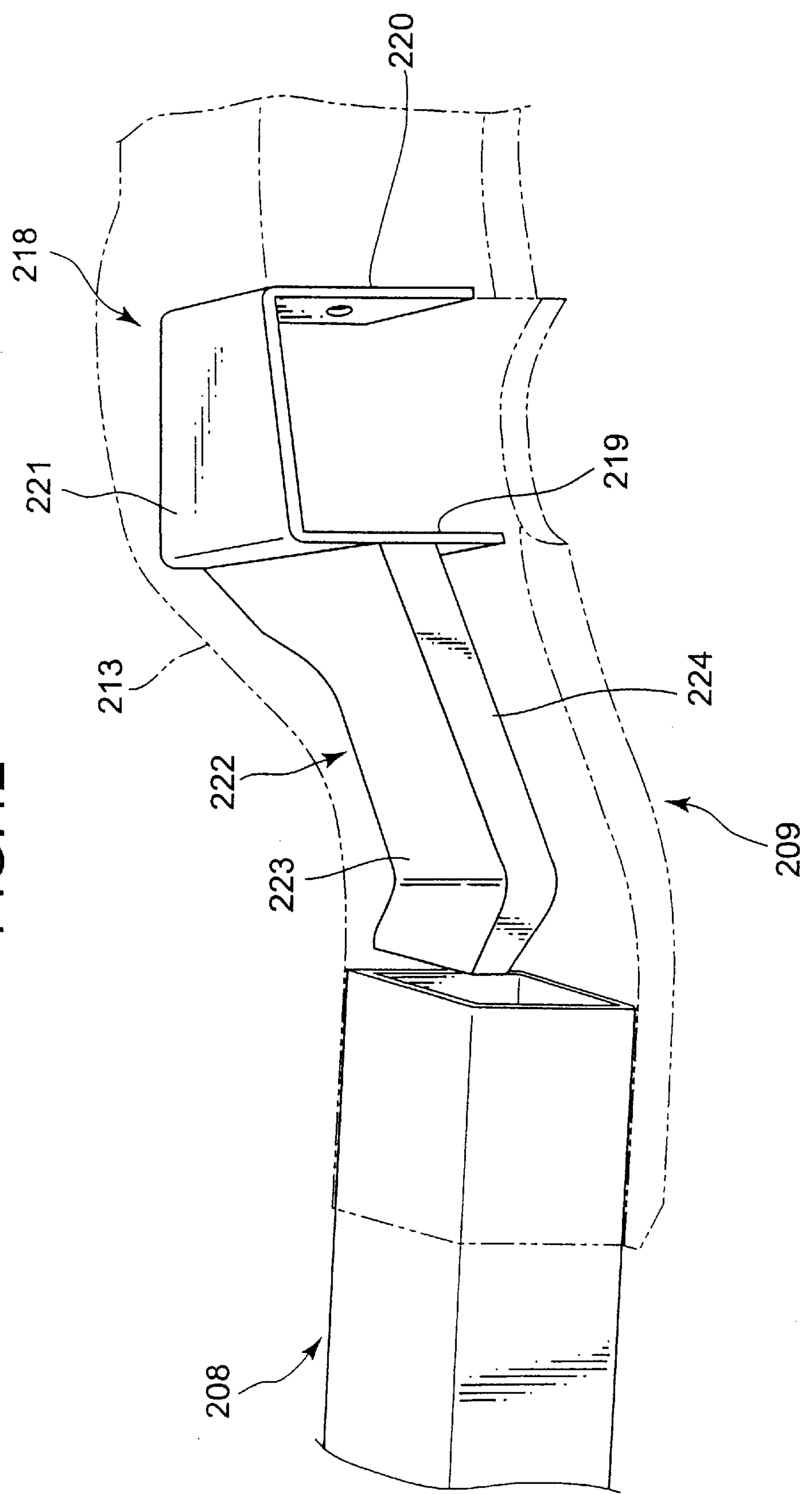
FIG. 12 is a side view showing the structure of a front part of a second frame in the second embodiment.

A suspension arm mounting member 218 for the front lower arm 202 is provided in each bend 213 at the front part of the second frame 209 to extend in the lateral direction of the vehicle. As shown in FIG. 12, the mounting member 218 for the front lower arm 202 has an inverted U-shaped cross section formed by a pair of front and rear side walls 219, 220 and a top wall 221. The proximal end of the lower arm 202 is pivotably mounted between the side walls 219, 220. The mounting members 218 installed in the bends 213 reinforcement nodes in the front part of the second frame 209.

Figure 13:
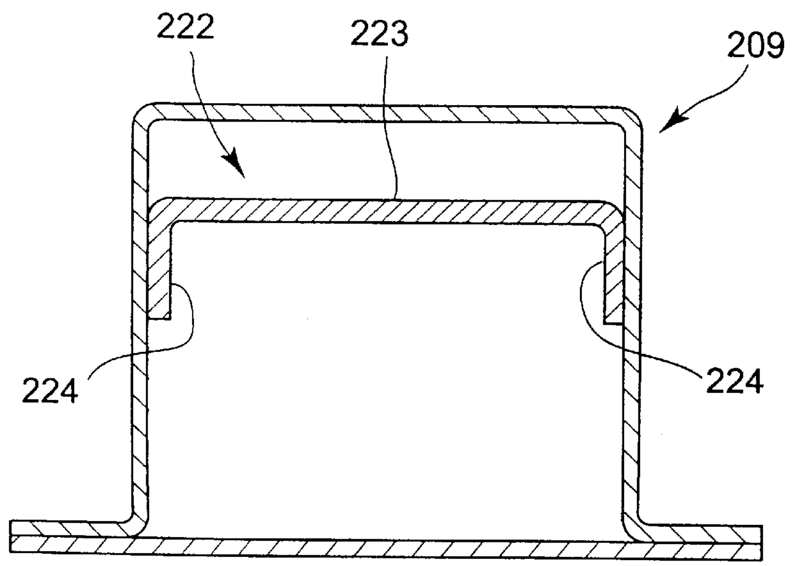
FIG. 13 is an explanatory perspective view showing a mount for a suspension arm.

A reinforcing member 222 extends forward from each mounting member 218. The reinforcing member 222 comprises a base plate 223 extending horizontally and having a predetermined width, and a pair of left and right flanges 224 extending downward from the opposite sides of the base plate 223. The reinforcing members 222 in the front portion of the second frame 209 make the front portion stronger than the first frame 208. As shown in FIG. 13, since the reinforcing member 222 is positioned in the upper region of the second frame 209, the upper portion at the front portion of the second frame 209 is especially reinforced.

As described above, the suspension structure of the second embodiment includes the suspension frame 201 formed of the perimeter frame of rectangular configuration in plan view. The front half of the suspension frame 201 is formed by the first frame 208 made of the deformed hollow tube member and the rear half of the suspension frame 201 is formed by the second frame 209 made of the press-formed member. The second frame member 209 includes the bends 213 bending inwardly with respect to the width direction of the vehicle. The mounting members 218 for the lower arms 202 are provided in the bends 218 and reinforce the front part of the second frame 209. According to the so-configured suspension structure, since the second frame 209 is not easily deformed at the bends 213 by impact load received at the time of vehicle collision, the suspension structure can sufficiently absorb the collision energy.

When the second frame 209 that forms the rear half of the suspension frame 201 is made by the press-forming member, which is light but easy to deform, the rigidity of the second frame 209 tends to be lower than that of the first frame 208 made of the hollow tube member. Therefore, the front part of the second frame 209 to which the rear end of the first frame 208 is connected collapses easily, especially at the bends 213, and the collision energy cannot be sufficiently absorbed. In the second embodiment, however, since the mounting members 218 are provided in the bends 213, deformation at the bends is effectively prevented.

Therefore, in the second embodiment, although the rear half of the suspension frame 201, where the mounting members for the lower arms 202, 203 are provided, consists of the second frame 209 made of a press-formed member, the collision energy can be effectively absorbed by gradual deformation of the first frame 208 made of the hollow tube member. In addition, this arrangement makes the suspension frame 201 light and easy to manufacture. Further, since the mounting members 218 for the lower arms 202. 203 are provided in the bends 213 to reinforce the front part of the second frame 209, deformation of the bend 213 is effectively prevented with a simple arrangement. Furthermore, since the mounting point for the lower arms 202 can be positioned more inwardly than in the case where the mounting member protrudes from the outer wall of the second frame 209, a space for the lower arm of predetermined length can be easily secured.

In the second embodiment, the reinforcing members 222 are provided forward of the mounting member 218 located in the bend 213 of the second frame 209, so that the strength of the second frame 209 where the reinforcing member 222 is provided is made stronger than that of the first frame 208. According to this construction, the first frame 208 made of the hollow tube member with relatively high rigidity can be deformed prior to the front part of the second frame 209 by an impact load received at the time of a vehicle collision, whereby rapid collapse of the suspension frame 201 can be reliably prevented and the first frame 208 and the second frame 209 are gradually deformed to effectively absorb the collision energy.

In the second embodiment, since the reinforcing members 222 are positioned at upper regions of the second frame 209, the upper portion of the front portion of the second frame 209 is especially reinforced. Therefore, when a collision load is received from the front side of the vehicle body, in the front part of the second frame 209, deformation of the upper portion where the reinforcing members 222 are positioned is restrained and deformation of the lower part is allowed.

Therefore, when collision occurs, the second frame 209 is bent at the front position located at substantially the central region in the longitudinal direction of the vehicle, so that the first frame is rotated downward around the front part of the second frame by the impact load received during the vehicle collision. As a result, since the height of the rear end of the engine moving backward in the vehicle collision can be lowered, intrusion of the engine into the cabin can be prevented.

In the second embodiment, the connecting brackets 215 are provided at the left and right ends of the second frame 209 as shown in FIG. 14. The left and right rear ends of the suspension frame 201 are connected to the mounting brackets 230 provided on the dash panel and the side sill 231. Therefore, the left and right ends of the suspension frame 201 are stably supported on the vehicle body. As a result, in a vehicle collision, the moment tending to move the suspension frame 201 in the lateral direction and the moment tending to separate the left and right front ends of the second frame 209 are effectively restrained. Thus, rapid deformation of the suspension frame 201 is prevented.

Although the present invention has been explained with reference to specific, preferred embodiments, one of ordinary skill in the art will recognize that modifications and improvements can be made while remaining within the scope and spirit of the present invention. The scope of the present invention is determined solely by appended claims.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A sub-frame structure of a motor vehicle comprising:

a pair of side frame sections extending in a longitudinal direction at predetermined lateral spacing, each side frame section respectively including a bend which bend laterally inward relative to the lateral spacing between front ends of the side frame sections;

a cross member section connecting the front ends of said side frame sections;

wherein said cross member section and end portions of the side frame sections including the front ends of the side frame sections connected to said cross member section are integrally formed of a deformed tube member and remaining portions of said side frame sections including said bends are formed of a closed section member fabricated by joining a plurality of members at flanges;

mounts respectively provided in each bend of the side frame sections formed of said closed section member for mounting suspension arms to the side frame sections, each of said mounts includes a mounting member having an inverted U-shaped member oriented to open laterally; and reinforcing members extending forwardly from said mounting members into said side frame sections.

2. A sub-frame structure of a motor vehicle according to claim 1, wherein said reinforcing members are positioned at upper regions of said side frame sections.

3. A sub-frame structure of a motor vehicle according to claim 1, wherein said sub-frame is a front sub-frame installed on a front side of a vehicle, an engine and a transmission being placed between a part of said side frame sections formed of said deformed tube member.

4. A sub-frame structure of a motor vehicle according to claim 1, wherein said sub-frame is a front sub-frame installed on a front side of a vehicle an engine and a transmission being placed side-by-side between a part of said side frame sections formed of said deformed tube member.

5. A sub-frame structure of a motor vehicle according to claim 1, further comprising reinforcing brackets that join the end portions of said side frame sections to end portions of the cross member section.

6. A sub-frame structure of a motor vehicle according to claim 1, further comprising a pair of connecting brackets for connecting ends of said side frame sections to a dash lower panel and a side sill of a vehicle body provided at ends of said side frame sections.

7. A sub-frame structure of a motor vehicle comprising:

a pair of side frame sections extending in a longitudinal direction at predetermined lateral spacing, each side frame section respectively including a bend which bend laterally inward relative to the lateral spacing between front ends of the side frame sections;

a cross member section connecting the front ends of the side frame sections;

wherein the cross member section and end portions of the side frame sections including the front ends are integrally formed of a deformed tube member, and remaining portions of the side frame sections including the bends are formed of a closed section member formed by members joined at flanges and has an interior;

wherein, at the bends of the side frame sections, the rear ends of the end portions of the side frame sections are respectively inserted into the interior of the closed section member forming the remaining portions of the side frame sections to connect the end portions of the side frame sections and the remaining portions of the side frame sections;

mounts being respectively provided in each bend of the side frame sections for mounting suspension arms to the side frame sections, each mount including a mounting member having an inverted U-shaped member oriented to open laterally; and reinforcing members extending through the bends of the side frame sections, the reinforcing members extend forwardly from the mounting members through the interior of the closed section member forming the remaining portions of the side frame sections and through an interior of the deformed tube member forming the rear ends of the end portions of the side frame sections.

* * * * *